(12) United States Patent  
Bauer

(10) Patent No.: US 6,648,625 B2
(45) Date of Patent: Nov. 18, 2003

(54) APPARATUS FOR MAKING MOLDED ARTICLES OF PLASTIC MATERIAL

(75) Inventor: Adolf Bauer, Olching (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 99 days.

(21) Appl. No.: 10/032,561

(22) Filed: Nov. 13, 2001

(65) Prior Publication Data

US 2002/0051834 A1 May 2, 2002

Related U.S. Application Data

(63) Continuation of application No. PCT/EP00/04157, filed on May 10, 2000.

(30) Foreign Application Priority Data

May 12, 1999 (DE) .......................................... 199 22 164

(51) Int. Cl.[7] .............................................. B29C 41/06
(52) U.S. Cl. ..................................... 425/429; 425/430
(58) Field of Search ................................ 425/429, 430, 425/434, 435

(56) References Cited

U.S. PATENT DOCUMENTS 3,337,662 A   8/1967   Spencer
4,183,883 A   1/1980   Blair
4,764,322 A * 8/1988   Pitavy et al. ................ 425/429
5,221,539 A * 6/1993   Pallerberg et al. .......... 425/429
5,374,180 A * 12/1994  Bauer ........................ 425/429

FOREIGN PATENT DOCUMENTS

EP    A1 0 502 378    2/1992

* cited by examiner

Primary Examiner—James P. Mackey
(74) Attorney, Agent, or Firm—Henry M. Feiereisen

(57) ABSTRACT

An apparatus for making molded articles of plastic material, in particular molded films of thermoplastic flakes, by using a slush molding process, includes a mold container having at least one interior space for receiving plastic material and a mold wall which can be heated and cooled in alternating sequence. The mold container is located within a support frame which is rotatable about a rotation axis, whereby the suspension of the mold container is so configured as to allow a movement of the mold container in three degrees of freedom. The suspension includes a combined swivel and shift arrangement, which is disposed between the support frame and the mold container and supports the mold container in such a manner as to effect a rotation of the mold container about a pivot axis, which is perpendicular to the rotation axis, and a reciprocating motion in the direction of the pivot axis.

7 Claims, 2 Drawing Sheets

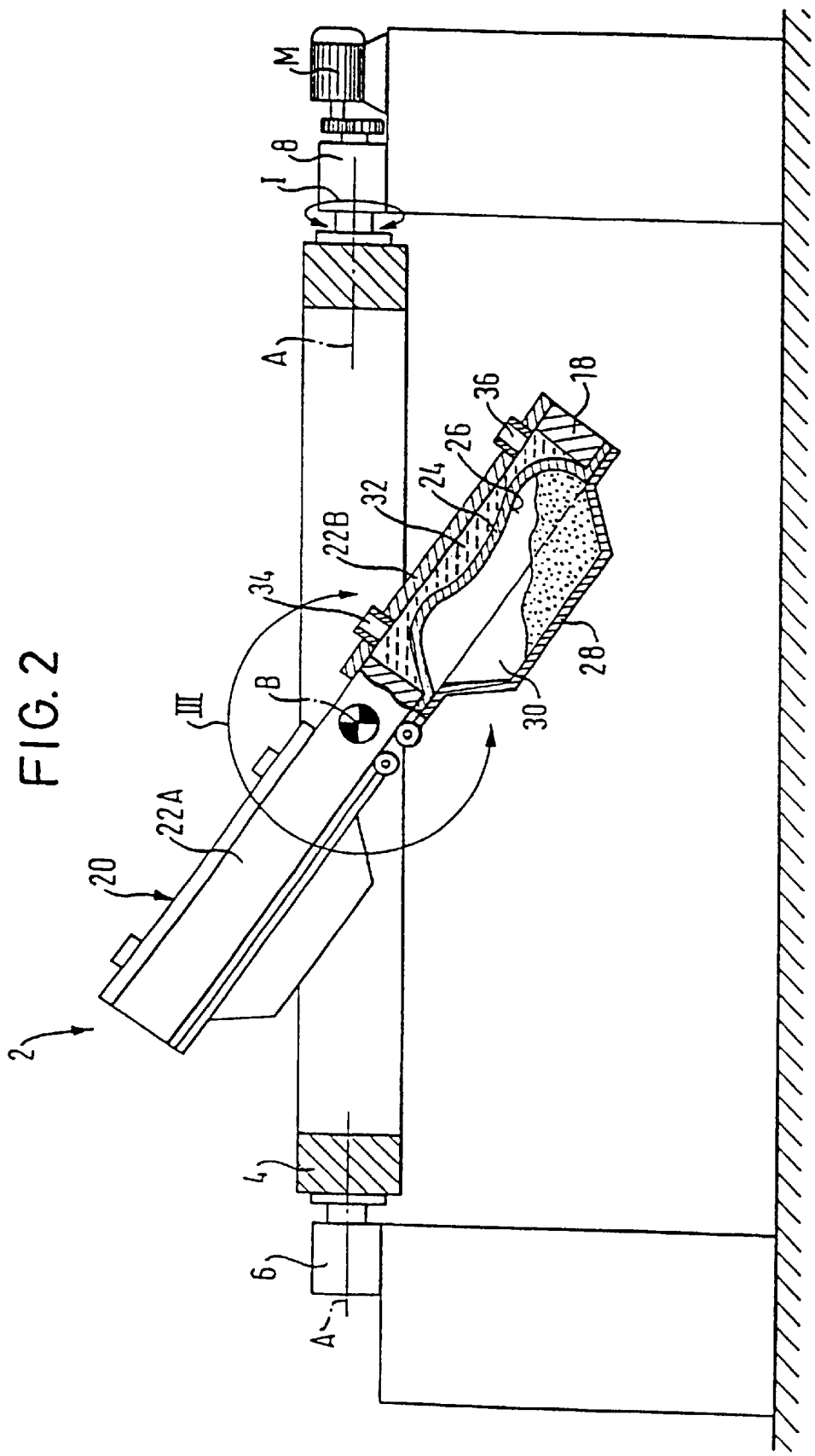

APPARATUS FOR MAKING MOLDED ARTICLES OF PLASTIC MATERIAL

CROSS-REFERENCES TO RELATED APPLICATIONS

This application is a continuation of prior filed copending PCT International application no. PCT/EP00/04157, filed May 10, 2000.

This application claims the priority of German Patent Application Serial No. 199 22 164.2, filed May 12, 1999, the subject matter of which is incorporated herein by reference.

BACKGROUND OF THE INVENTION

The present invention relates, in general, to an apparatus for making molded articles of plastic material, in particular molded films of thermoplastic flakes, by using a slush molding process, and more particularly to a molding apparatus of a type having a mold container with an interior space for receiving plastic material and a mold container surface which can be heated and cooled in alternating sequence, and a support frame, operated for rotating about a rotation axis of, for supporting the mold container.

European Pat. No. EP-A1 0 502 378 describes a molding apparatus for making molded films from flake-like or pulverulent plastic materials by utilizing a slush molding process. The molding apparatus includes a split mold container made of a shell heated and cooled sequentially and a powder box, whereby the mold container can be rotated back and forth about two axes in perpendicular relationship and, in addition, moved in reciprocating fashion in the direction of one pivot axis in order to realize an even film thickness and a high-grade surface quality, especially when wound configurations are involved during adherence of a layer of plastic to an inner mold container wall. The mold container is supported hereby in a support frame for limited displacement in linear direction, with the support frame being held on its ends by bearings and operated for rotation about its longitudinal axis. The bearings can be selectively moved up and down by means of separately controllable hydraulic cylinders, which additionally effect a tilting movement of the bearings in unison with the mold container about a pivot axis extending perpendicular to the longitudinal axis. Such a swivel kinematics is complicated in structure and requires powerful lifting drives. In addition, there is the drawback that the swivel motion of the mold container is possible only within a limited angular range and a biaxial, fully turnable suspension of the mold container cannot be implemented at all.

It would therefore be desirable and advantageous to provide an improved apparatus for making molded articles of plastic material, which obviates prior art shortcomings and is simple in structure and which allows a support of the mold container to allow a biaxial fully rotatable configuration and reciprocation in the direction of one axis, while reducing moving masses, and yet being reliable in operation.

SUMMARY OF THE INVENTION

According to one aspect of the present invention, an apparatus for making molded articles of plastic material, in particular molded films of thermoplastic flakes, by using a slush molding process, includes a mold container having at least one interior space for receiving plastic material and a mold wall which can be heated and cooled in alternating sequence, a support frame rotatable about a rotation axis, and a combined swivel and shift arrangement disposed between the support frame and the mold container and supporting the mold container in such a manner as to effect a rotation of the mold container about a pivot axis, which is perpendicular to the rotation axis, and a reciprocating motion in the direction of the pivot axis.

The present invention resolves prior art problems by providing a suspension of the mold container by using hinged connections that allow biaxial rotatable and linear movements, involving only very simple structural features. The linear movement and rotational movements about the pivot axis are executed by the mold container only, without conjoint movements by the support frame. As a consequence, the moving masses and thus the stress on associated bearings and drives can be kept to a minimum, and an uninhibited rotational movement of the mold container about both axes can be realized.

In order to allow variation of the movement pattern in all three degrees of freedom of the mold container, the swivel drive and the linear drive for the mold container as well as the rotary drive for the support frame can be controlled independently from one another.

According to another feature of the present invention, the mold container includes two interior spaces which are separated from one another and positioned in symmetric relationship to the pivot axis. As a result, the manufacturing capacity of the apparatus can be doubled in a simple manner.

BRIEF DESCRIPTION OF THE DRAWING

Other features and advantages of the present invention will be more readily apparent upon reading the following description of a preferred exemplified embodiment of the invention with reference to the accompanying drawing, in which:

FIG. 2 a partially sectional side view of the apparatus of FIG. 1.

DETAILED DESCRIPTION OF PREFERRED EMBODIMENTS

Figure 1:
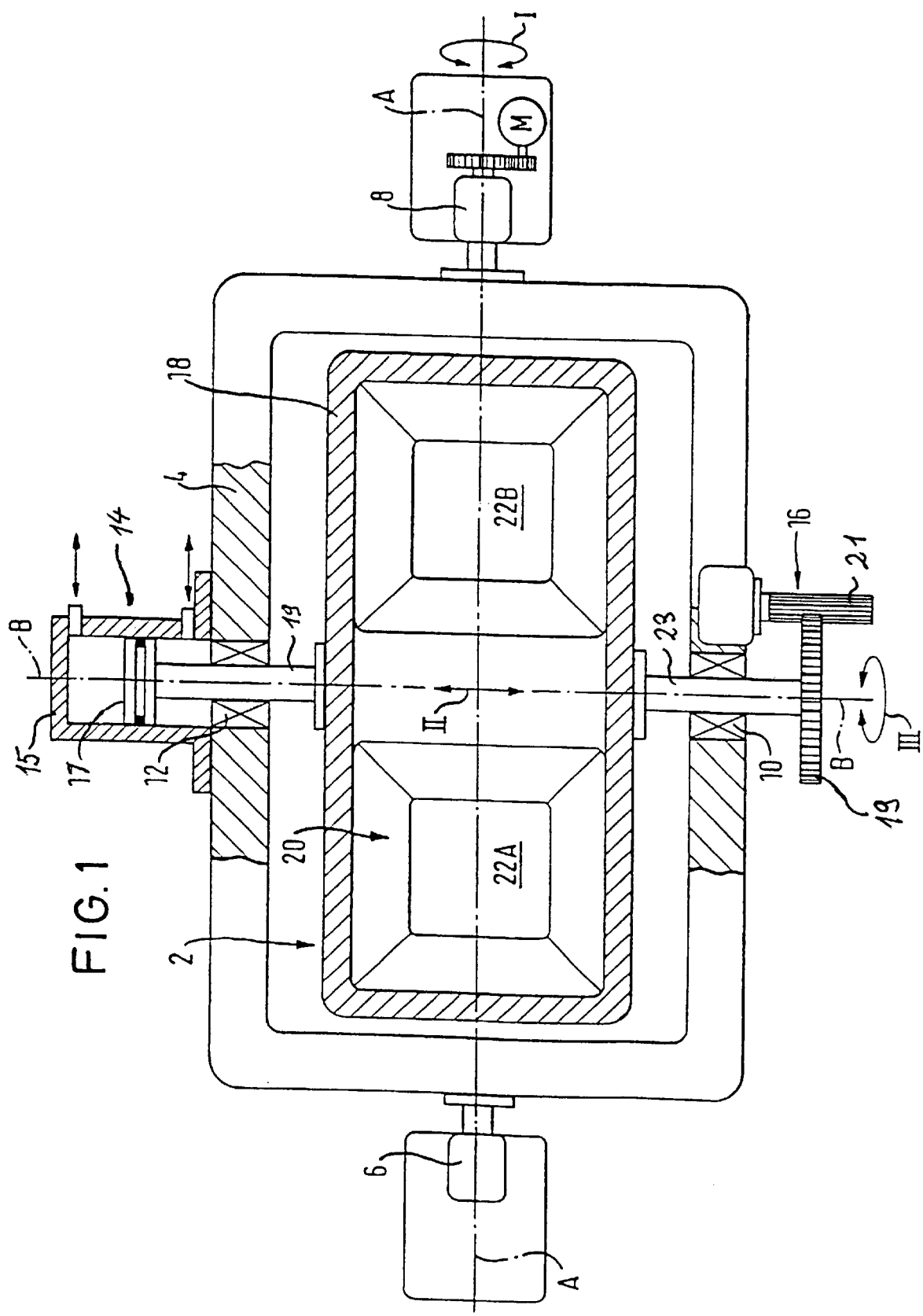
FIG. 1 is a plan view of an apparatus according to the present invention for making films of thermoplastic, flake-like plastic powder, using a slush molding process.

Throughout all the Figures, same or corresponding elements are generally indicated by same reference numerals.

Turning now to the drawing, and in particular to FIG. 1, there is shown a plan view of an apparatus according to the present invention for making molded films, e.g. dashboards of motor vehicles, of thermoplastic, flake-like material or plastic material in powder form, using a slush molding process. The molding apparatus includes a mold container 2, which is suspended for movement in three degrees of freedom, whereby a, not shown, control unit can individually control the movements. The mold container 2 is held in a support frame 4 which is received on opposite ends by bearings 6, 8 for rotation in the direction of arrow I about a horizontal rotation axis A by means of a motor M. A fully rotatable support of the mold container 2 about a second pivot axis B, which is perpendicular to the rotation axis A, in combination with a limited translatory movement is effectuated through provision of opposite swivel and shift joints 10, 12, which are disposed respectively laterally between the mold container 2 and the support frame 4.

The mold container 2 is comprised of an inner frame 18, which is placed inside the support frame 4 at a clearance thereto, and a mold assembly, generally designated by reference numeral 20 and secured to the inner frame 18. In order to increase the production capacity, the mold 20 includes two molds 22A, 22B in side-by-side symmetric relationship with respect to the pivot axis B.

As shown in particular in FIG. 2, which is a partially sectional side view of the molding apparatus of FIG. 1, each mold 22A, 22B (only the right hand mold 22B is shown here in detail) includes a thin-walled, galvanoplastic shell 24 which has an inner mold wall 26 of a contour in correspondence to the molded article to be produced. The mold wall 26 may also be labeled as the "electroplate" that provides the actual shaping action. Detachably secured to the mold container 2 is a powder box 28, which defines the interior space 30 in unison with the mold wall 26 for receiving the plastic material. In the area of the molds 22A, 22B, the mold assembly 20 has a double-walled configuration to define a cavity 32 on the backside of the shell 24, i.e. on the electroplate-distal side. The cavity 32 is fluidly connected to inlet and outlet ports 34, 36 for circulating a cooling and heating medium, for example, oil. Thus, during the molding process, the mold wall 26 is alternatively heated and cooled.

Operatively connected to each of the joints 10, 12 is a linear drive in the form of a reversible hydraulic actuating drive, generally designated by reference numeral 14 for implementing a reciprocating movement of the mold container 2 in direction of arrow II, and a swivel drive generally designated by reference numeral 16 for implementing a rotation of the mold container 2 in direction of arrow III relative to the support frame 4. The linear drive 14 is configured in the form of a piston and cylinder arrangement including a cylinder 15 mounted to the outside of the support frame 4 and a piston 17 reciprocating within the cylinder 15 and having a piston rod 19 which extends through the support frame 4 to abut with its piston-distal end against the inner frame 18 of the mold container 2 and is guided and supported by the joint 12. The swivel drive 16 is configured in the form of a rack and pinion arrangement including a pinion 19 which is operated by a rack 21 and has a shaft 23 which extends through the support frame 4 to abut with its pinion-distal end against the inner frame 18 of the mold container 2 and is guided and supported by the joint 10.

The linear drive 14, the swivel drive 16 and the motor M can be controlled separately from one another by the control unit, not shown.

The molding process is as follows: The powder box 28 of each mold 22A, 22B is initially detached from the mold assembly 20 to allow filling of the interior space 30 with plastic material. After reattachment of the powder box 28, the mold container 2 is operated and controlled in accordance with a program so as to rotate about both axes A, B several times in one or the other direction and moved back and forth in the direction of pivot axis B. At the same time, the mold wall 26 is heated so that plastic material melts on the mold wall 26 to deposit there layer by layer at uniform layer thickness. Subsequently, cooling medium is circulated through the cavity 32, so that the deposited plastic material on the mold wall 26 solidifies to a film, which can be removed after detaching the powder box 28 from the mold container 2.

While the invention has been illustrated and described as embodied in an apparatus for making molded articles of plastic material, it is not intended to be limited to the details shown since various modifications and structural changes may be made without departing in any way from the spirit of the present invention.

What is claimed as new and desired to be protected by Letters Patent is set forth in the appended claims.

What is claimed is:

1. Apparatus for making molded articles of plastic material, in particular molded films of thermoplastic flakes, by using a slush molding process, comprising:

a mold container having at least one interior space for receiving plastic material and a mold wall which can be heated and cooled in alternating sequence, a support frame rotatable about a rotation axis; and a combined swivel and shift arrangement disposed between the support frame and the mold container and supporting the mold container in such a manner as to effect a rotation of the mold container about a pivot axis, which is perpendicular to the rotation axis, and a reciprocating motion in the direction of the pivot axis.

2. The apparatus of claim 1, wherein the swivel and shift arrangement includes a swivel drive for implementing the rotation of the mold container, and a linear drive for implementing the reciprocating motion of the mold container, and further comprising a rotary drive for rotating the support frame about the rotation axis, wherein the swivel drive, the linear drive and the rotary drive are controllable independently from one another.

3. The apparatus of claim 1, wherein the mold container has two of said interior space, wherein the two interior spaces are arranged in symmetric relationship to the pivot axis and separated from one another.

4. Apparatus for making a molded article of plastic material, comprising:

a frame;

a mold having a mold wall for providing a molding action and configured in the form of a double-walled body for allowing circulation of a heating and cooling medium;

a first drive for rotating the frame about a rotation axis;

a second drive for rotating the mold relative to the frame about a pivot axis which is perpendicular to the rotation axis; and a third drive for moving the mold in a direction of the pivot axis.

5. The apparatus of claim 4, and further comprising a control unit for operating the first, second and third drives independently from one another.

6. The apparatus of claim 4, wherein the second drive is a swivel drive in the form of a rack and pinion unit having a shaft operatively connected to the mold and supported by a bearing assembly in the frame to allow a rotational movement.

7. The apparatus of claim 4, wherein the third drive is a linear drive in the form of a piston and cylinder unit having a piston rod operatively connected to the mold and supported by a bearing assembly in the frame to allow a linear movement.

* * * * *